United States Patent [19]

Lang et al.

[11] Patent Number: 4,944,162
[45] Date of Patent: Jul. 31, 1990

[54] HELICAL CONVEYOR FOOD FREEZER

[75] Inventors: Gary D. Lang, Naperville; Brian E. Sink, Orland Park, both of Ill.

[73] Assignee: Liquid Carbonic Corporation, Chicago, Ill.

[21] Appl. No.: 432,594

[22] Filed: Nov. 7, 1989

[51] Int. Cl.$^5$ .............................................. F25D 25/04
[52] U.S. Cl. ...................................... 62/380; 62/374; 198/831; 198/852
[58] Field of Search .................... 62/63, 374, 380, 266; 198/831, 852

[56] References Cited

U.S. PATENT DOCUMENTS

| | | | |
|---|---|---|---|
| 2,872,023 | 2/1959 | Bechtel, Jr. | 198/852 |
| 3,255,898 | 12/1965 | Roinestad | 198/181 |
| 3,261,451 | 7/1966 | Roinestad | 198/136 |
| 3,348,659 | 10/1967 | Roinestad | 198/136 |
| 3,467,239 | 9/1969 | Roinestad | 198/195 |
| 4,333,318 | 6/1982 | Tyree, Jr. | 62/374 |
| 4,741,430 | 5/1988 | Roinestad | 198/778 |
| 4,867,301 | 9/1989 | Roinestad et al. | 198/852 |
| 4,878,362 | 11/1989 | Tyree, Jr. | 62/381 |

Primary Examiner—Ronald C. Capossela
Attorney, Agent, or Firm—Fitch, Even, Tabin & Flannery

[57] ABSTRACT

A freezer includes an insulated enclosure for maintaining low temperatures therewithin and a conveyor belt that carries food products throughout the enclosure. The conveyor belt includes a straight-line path section and at least one helical path section and is driven by vertical drive elements carried by a rotating drum about which the conveyor helical path section is located. Upon entering a helical path section from a straight-line path section, the conveyor belt undergoes expansion only, with the inner ends of its transverse rods maintaining a precise spacing which allows smooth interengagement between heads at the inboard ends of the rods and the leading surfaces of the vertical drive elements that are located along the circumference of the rotating drum which defines the curved helical path. Because of the improved arrangement, both an ascending helical path and a descending helical path can be established within a single freezer with both rotating drums simply driven by a single motor.

13 Claims, 6 Drawing Sheets

HELICAL CONVEYOR FOOD FREEZER

The present invention relates to food freezers and more particularly to food freezers which use endless conveyor belts that undergo a transition between a straight-line path and a helical path and to freezer arrangements for driving such food product-carrying conveyor belts.

BACKGROUND OF THE INVENTION

Several conveyor belt arrangements are currently in use for transporting food or other products through freezers typically including an insulated enclosure for maintaining temperatures which are below ambient temperature. In order to provide a relatively long path length within an insulated enclosure of minimal volume and external surface area, a conveyor belt which transports products through the enclosure is frequently made to traverse one or more helical paths (which are sometimes termed "spiral" paths in the industry). Such conveyor belts experience a change in configuration across their width, generally along both their inner and outer edges, at points of transition between a straight-line path section and a helical path section. To date, such conveyor belts either have undergone a contraction along their inner edge alone or have undergone contraction and expansion along their inner and outer edges, respectively, in assuming a helical path configuration.

Such conveyor belts are generally driven, in part, by frictional engagement with a central drum which rotates about a vertical axis, and it accordingly becomes necessary to attempt to "overdrive" such belts to maintain sufficient tension in the belt to achieve the needed frictional engagement in the helical region. This becomes increasingly difficult to maintain when there is more than one helical section through which the belt passes within the freezer enclosure. Moreover, when the inner edge region of such a conveyor belt undergoes contraction, the distances between the radially inner ends of rods or other transverse members of the conveyor belt change individually and are not uniform. Although attempts have been made to positively drive such conveyor belts by engagement with the exterior surface of such a rotating drum, as for instance shown in U.S. Pat. No. 4,741,430 (May 3, 1988), they have not been successful because of the creation of excessive wear in the vertical driving elements and in the belts, which has often caused upsetting of the belt (Christmas-tree effect) as a result of high tension at the outward edge of the belt which creates hoop stress and eventual damage to the conveyor belt.

SUMMARY OF THE INVENTION

The present invention provides a freezer which uses a combination of conveyor belt and drive drum design that affords smooth transition between a straight-line path and a helical path while maintaining a precise fixed spacing or pitch along the inner edge of such belt which permits smooth and accurate interengagement between drive elements carried by the drum and such belt.

The conveyor belt undergoes only longitudinal expansion radiating outward from fixed points along its inner edge whenever the conveyor belt changes configuration from a straight-line path to a helical path within the insulated freezer enclosure. Temperatures are maintained well below ambient so that, when the conveyor belt carries food products from the enclosure entrance to the enclosure exit, they are subjected to such a controlled low temperature environment within the enclosure for a substantial period of time. The conveyor belt travels along an initial straight-line path preferably from a lower entrance to a transition point where it assumes an ascending helical path configuration, undergoing only longitudinal expansion as it moves into engagement with the exterior surface of the drive drum. The conveyor belt includes a plurality of transverse rods that extend between inner and outer lateral edges of the conveyor belt, and the inner ends of such rods are interconnected by pairs of first links, at points adjacent the inner lateral edge of the conveyor belt, of a design such that there is substantially no provision for relative longitudinal movement between rods—as a result, such rods retain a precise spacing from one another along the inner edge.

Because of such precise spacing between adjacent rods, it is practical to maintain the inner edge of the belt in tension and to slidably engage heads at the inner ends of these rods by vertically extending drive elements located on the exterior surface of the drive drum, while substantially eliminating tension at the outer edge of the belt to avoid hoop stress.

DETAILED DESCRIPTION OF THE PREFERRED EMBODIMENTS

A freezer 10 includes an insulated enclosure 12 having an internal cavity 14 which is maintained at below ambient temperature by a suitable refrigeration system. The refrigeration system may inject cryogenic liquid into cavity 14 so as to provide a desired low temperature environment to freeze products being transported therethrough, or it may introduce a refrigerated medium, such as refrigerated air. A pair of blowers or fans 18 are provided within the enclosure, throughout which the food products being frozen are carried by a conveyor belt 20. Each blower 18 draws suction from the central interior region of a helical path section 22 of the conveyor, creating circulation of the atmosphere generally throughout the cavity 14 and specifically drawing the cold atmosphere across the surfaces of the helical belt and providing heat transfer rates sufficient to freeze products carried thereon as the products move along the belt pathway. The details of such blower arrangements are set forth in copending U.S. Pat. application Ser. No. 373,056, filed June 28, 1989, the disclosure of which is incorporated herein by reference.

Figure 1:
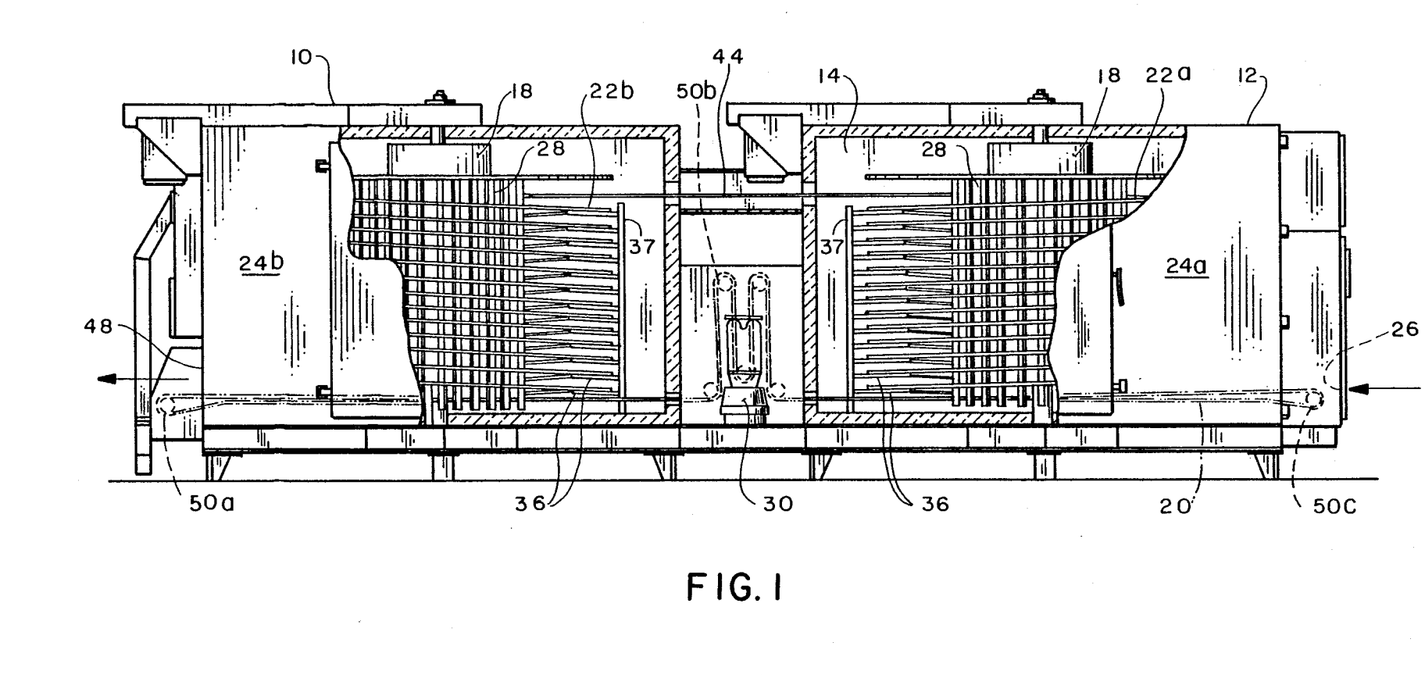
FIG. 1 is a front view of a food freezer embodying various features of the present invention.
Figure 5:
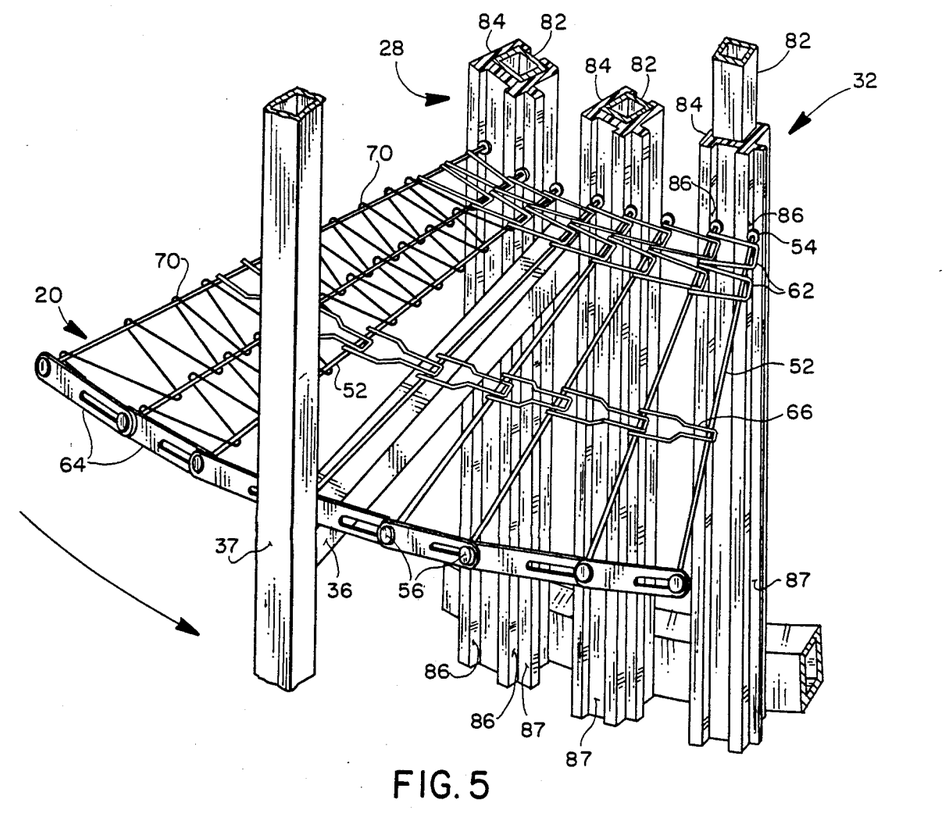
FIG. 5 is a fragmentary perspective view illustrating the interengagement between the vertical drive elements of the drum and the conveyor belt.

The enclosure 12 includes a pair of interconnected compartments 24a and 24b each of which contains a helical conveyor section 22. The compartment 24a has an entrance opening 26 through which products are loaded on the conveyor belt for travel throughout the freezer 10. Disposed within enclosure 14 are a pair of cylindrical drive drums 28a and 28b which may be of the general type disclosed in U.S. Pat. No. 3,348,659. Both drive drums have an opening at the top where the blower 18 is mounted, are closed at the bottom and are preferably driven by a single motor 30 for rotation about vertical axes (see FIG. 2). For example, chain drives can be used to turn sprockets mounted near the lower end of each drum shaft, or alternatively the motor 30 operating through a suitable gear reduction unit can power a pair of horizontal drive shafts, each of which is connected by suitable bevel gears to the lower end of one of the drum shafts. Each drum 28 includes a plurality of precisely spaced-apart, parallel, vertically extending drive elements 32 located about its circumference which engage the inboard or inner edge of the conveyor belt 20 so as to positively drive the conveyor belt along the double-helical path illustrated in FIGS. 1 and 2. Suitable supporting framework is mounted on the floor of the enclosure and includes arrays of generally radially oriented struts 36 supported at their outer ends via vertical posts 37 of the framework structure (see FIG. 5). The struts 36 extend underneath the various tiers of the conveyor belt 20 and provide support for the belt and precisely define the helical path thereof, as shown in detail in the above-mentioned U.S. Patent Application.

Figure 2:
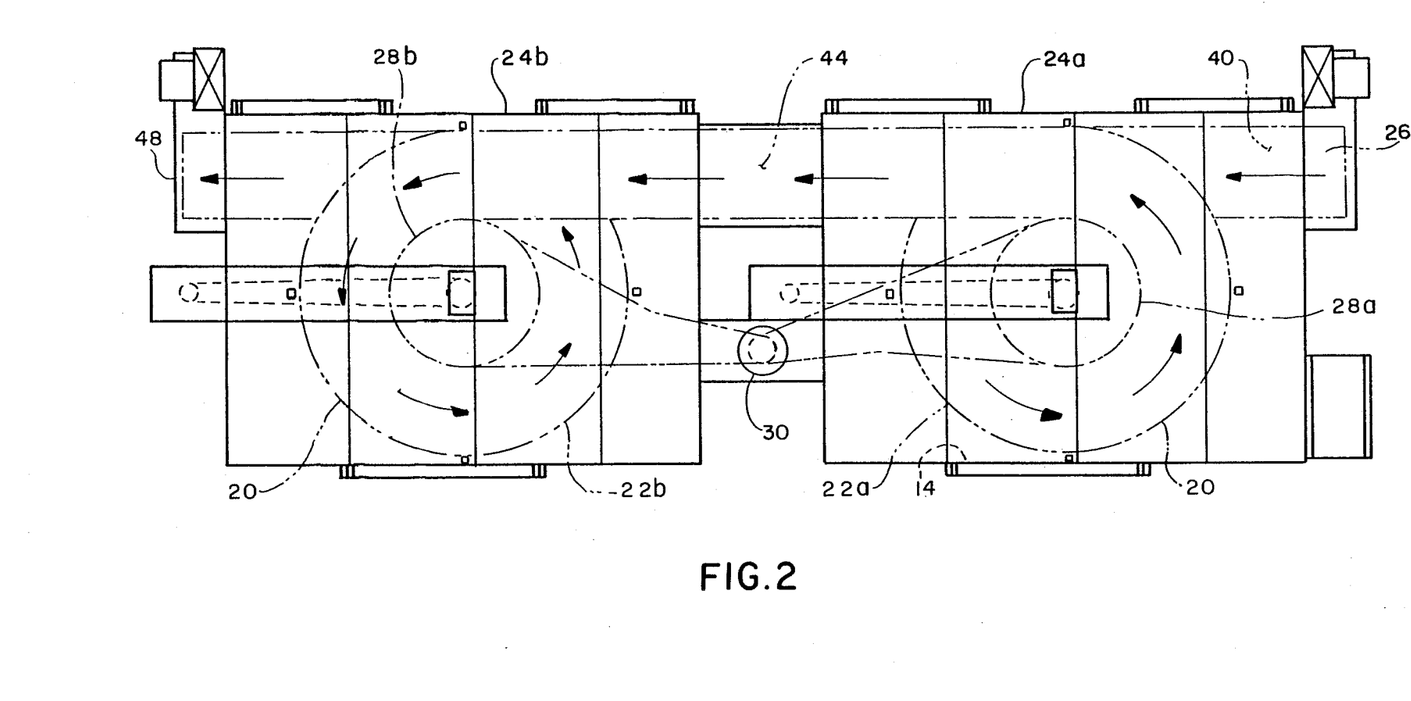
FIG. 2 is a plan view of the food freezer shown in FIG. 1.

As illustrated in FIG. 2, conveyor belt 20 has an initial straight-line path section 40 along which food products pass upon entering the opening 26 into the enclosure, traveling in the direction of the arrows shown in FIG. 2. Confining means, such as a C-shaped channel 42 (FIG. 3) or a pair of upper and lower guide rails, can optionally be provided along the outboard edge or right-hand edge (with respect to its direction of forward movement) of the conveyor belt 20 in its straight-line sections. Thereafter, the conveyor belt 20 enters its first helical path section 22a, wherein a series of ascending windings or tiers of the conveyor belt are defined and supported by the struts 36 which support the combined weight of the conveyor belt and products loaded thereon. Either the outer ends of the struts 36 or the vertical posts 37 of the framework stabilize the conveyor belt against any outward lateral movement. At the upper end of the ascending helical section 22a, the belt enters a straight-line crossover section 44 through which it leaves the compartment 24a and enters the compartment 24b where it enters the descending helical section 22b.

After leaving the second descending helical path section 22b, the conveyor belt 20 travels to an exit opening 48 in the enclosure 12. Vapor may be removed or exhausted from the vicinity of the exit opening of the freezer through which the frozen products on the conveyor belt 22 are discharged from the freezer 10, as well known in the art. A transfer conveyor, for example, not shown, may be provided just below an exit roller 50a over which the conveyor belt 20 passes. The roller 50a is mounted on a shaft which is preferably driven by a motor to assist in driving the conveyor belt along its straight-line and intermediate path sections. A driven roller 50a may incorporate a sprocket wheel at the inboard edge of the belt having teeth preferably designed to engage the left hand or inboard portions of the plurality of transverse rods 52, generally at location within interconnecting links 62, in the manner generally disclosed in U.S. Pat. No. 3,467,239. As the conveyor belt returns to the entrance region, it is looped through a series of rollers 50b which define an intermediate take-up path section that accommodates the difference in length that results from thermal contraction and keeps suitable tension on the belt at all times. A roller 50c located at the entrance 26 orients the belt 20 for passage along the initial straight-line path section 40, where products to be frozen are conveniently loaded onto the conveyor belt. The roller 50c may optionally be driven; however, the main drive for propelling the conveyor belt along its path of travel is the pair of drums which carry vertical drive elements 32 that engage the conveyor belt 20 along its inboard edge as described in detail hereinafter.

Figure 3:
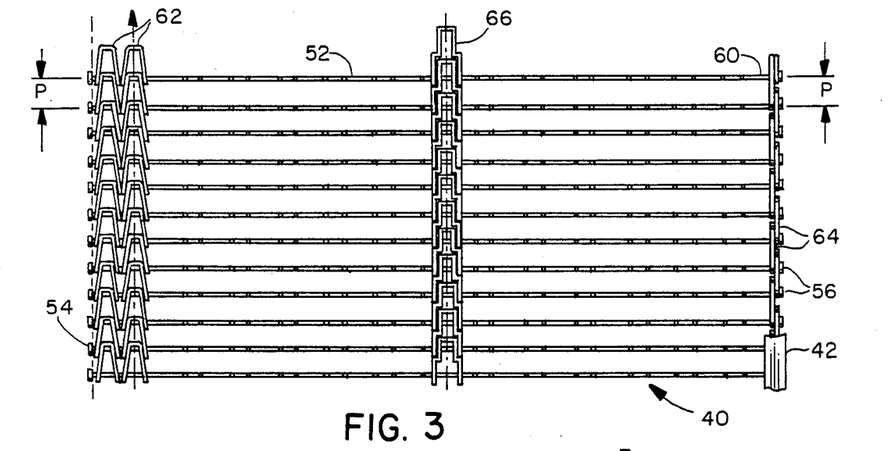
FIG. 3 is a plan view of the conveyor belt employed in the freezer of FIG. 1 in its straight-line configuration in the entrance section of the freezer.
Figure 4:
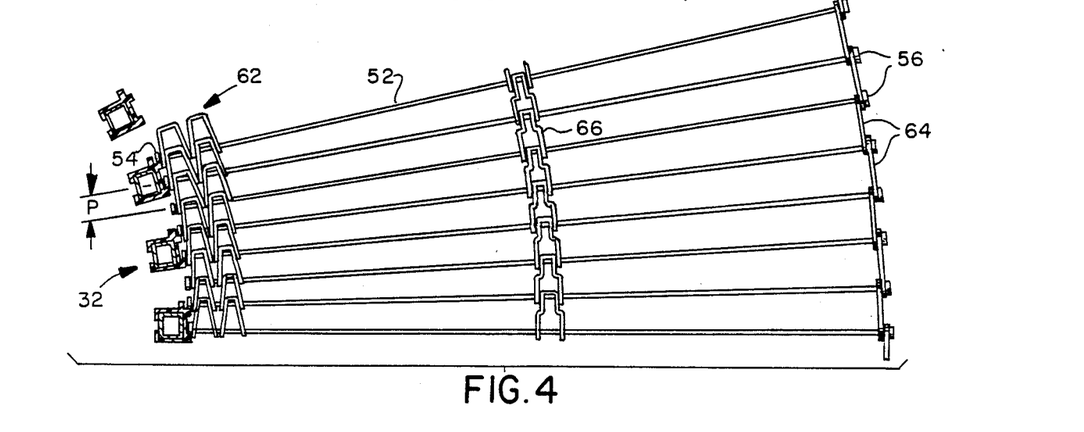
FIG. 4 is a plan view of the conveyor belt of FIG. 3 taken at a section along the helical path of the conveyor belt and showing its driving interconnection with the drive drum.

FIGS. 3 and 4 illustrate the two different configurations which the conveyor belt 20 assumes corresponding to the straight-line path and helical path sections, respectively. The illustrated conveyor belt 20 only expands as it enters the helical path section 22a, where the conveyor belt curves about the rotating drum 28a. The changes in configuration of the conveyor belt, particularly as it leaves the straight-line path section 40 of FIG. 3 and enters the helical path section 22 of FIG. 4, are carefully controlled due to the construction of the conveyor belt so that inboard ends of the rods undergo substantially no change in spacing or pitch. For example, the pitch P or spacing between rods 52 may be 1.080 inch in the straight path section (FIG. 3), and the pitch P remains substantially the same in the helical path section (FIG. 4). Stated another way, the pitch should vary by less than 0.005 inch, and preferably by less than 0.001 inch.

As best seen in FIGS. 3 and 4, the conveyor belt 20 is preferably constructed of a plurality of rods 52 extending in a direction generally normal to the straight-line path of the conveyor belt. The rods 52 preferably have an enlarged head 54 at the inboard end and may also have an enlarged head 56 at the outboard end, which heads define the furthermost bounds of the opposite lateral edges of the conveyor belt. The inner end portions of the rods 52 are pivotally interconnected by pairs of links 62, each formed of flat metal stock, located adjacent the heads 54. FIGS. 3 and 4 are plan views of portions of the conveyor belt, the first lying in a generally horizontal plane, and the second lying along a relatively flat but slightly inclined portion of the helical path. By comparing the left hand portions of FIGS. 3 and 4, it can be seen that adjacent leading and following links 62 can be slightly angularly displaced one from the next, the angular displacements occurring in the plane of the belt, thus allowing the inner edge of the belt to conform to a circular or helical path. Outer end portions 60 of rods 52 are interconnected by a series of slotted links 64, which can be made of flat plate material and which flat links 64 allow expansion to occur along the outer edge of belt 20. A series of slightly elongated generally U-shaped links 66 are located centrally of each of the rods which, as can be seen by comparing FIGS. 3 and 4, allows controlled expansion in the central region of the belt.

Figure 3A:
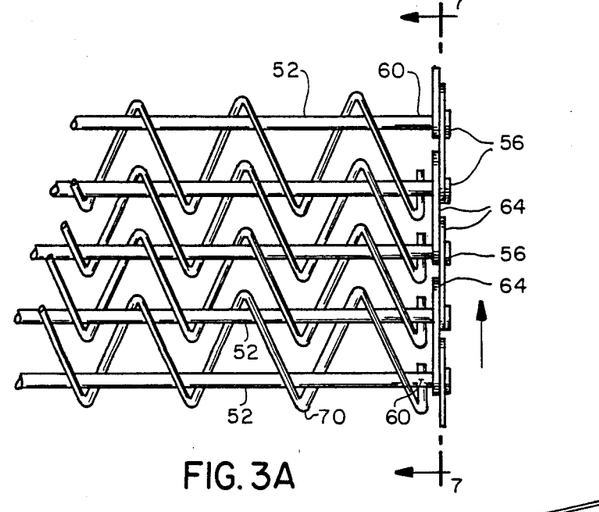
FIG. 3A is an enlarged plan view of the conveyor belt in a straight-line configuration with product-supporting wire sections installed.

A plurality of bent wire sections 70 (FIGS. 3A and 5), as are well known in the art, can be used to form an extended upper product-supporting surface, which is substantially open to allow a continuous flow of cooling medium therethrough regardless of whether the food product-carrying belt is in the straight-line or helical path section. Alternatively, snap-on molded plastic sectors can be employed to interconnect adjacent rods 52 and provide similar food product-carrying surface elements. When wire sections 70 are used, each wire section is wrapped around a pair of rods 52 to create the product supporting surface, as illustrated in FIG. 3A and described in copending U.S. Pat. application Ser. No. 211,985, now U.S. Pat. No. 4,878,362, the disclosure of which is incorporated herein by reference. A pair of rods 52, together with a bent wire section wrapped therearound, creates a region of the conveyor belt that only expands as the belt undergoes transition from the straight to the helical path. A pair of such appropriately dimensioned wire or plastic sections are associated with each rod, one inward of and one outward of the intermediate links 66 of the conveyor belt.

Figure 4A:
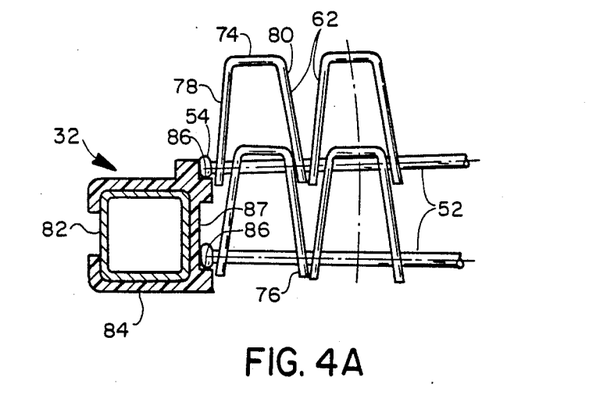
FIG. 4A is an enlarged fragmentary sectional view showing details of the interengagement illustrated in FIG. 4.

As best seen in FIG. 4A, flat wire links 62 are generally U-shaped in plan view, having an upstream closed end 74 and downstream free ends 76. Links 62 each include a pair of sidewalls 78, 80 joined at their upstream ends to opposite ends of a front wall 74. The tapered shape of the links 62 permits their partial internesting wherein the closed front end of one link is received within the wider rearward portion of the adjacent link. The dimensions of the links 62 preferably provide a slight gap between the adjacent sidewalls of internested links to accommodate the slight horizontal angular displacement between adjacent internested links, as illustrated in FIGS. 4 and 4A, when they are in the helical path section; in other words, the dimension between inner surfaces of the link sidewalls of the open end is slightly greater than the dimension between the outer surfaces of the link closed end.

Rod-receiving apertures formed in the forward portions of sidewalls therein are just slightly elongated in the lengthwise direction of belt 20 to accommodate some slight angular displacement of rods 52. This freedom of movement between adjacent links permits belt 20 to pass over the various guide rollers 50, illustrated in FIG. 1, such as those located adjacent the discharge opening 48, the entrance opening 26 and in the intermediate take-up section where it drastically changes direction. The apertures formed in the trailing or free ends of the links 62 which receive rods 52 are also just slightly elongated in the direction longitudinally of conveyor belt 20 so as to permit similar horizontal angular displacement of the rods received therein.

Figure 6:
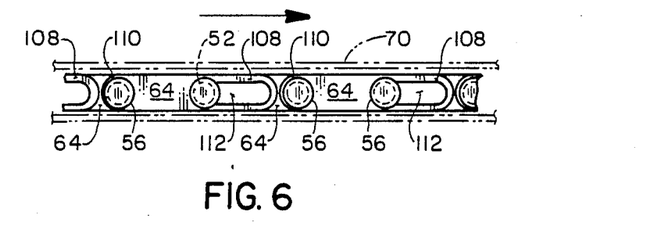
FIG. 6 is a fragmentary side view, enlarged in size, of the belt shown in FIG. 3A.
Figure 7:
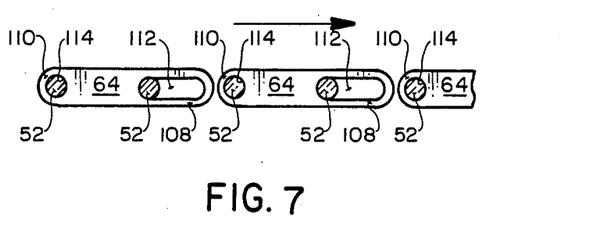
FIG. 7 is a fragmentary sectional view taken along line 7—7 of FIG. 3A.

The bar links 64 adjacent the outer lateral edge of the belt 20 interconnect pairs of adjacent rods 52, with such links alternating between inner and outer positions at the lateral outer edge of the conveyor belt. The links are identical and have slots 112 (FIGS. 6 and 7) formed therein in their leading portions 108 which are elongated longitudinally of the conveyor belt. Each link 64 interconnects a pair of adjacent transverse rods 52, so that the end of each rod protrudes through overlapping portions of two adjacent links and terminates in the enlarged head 56.

The trailing portions 110 of links 64 each have a rod-receiving aperture 114 formed therein which more closely conforms to the cross-sectional shape of rod 52. As is apparent by comparing FIGS. 3A and 4, the forward and rearward ends of adjacent links very substantially overlap each other in the straight-line section, with the rearward aperture of an upstream link being located at the rear end of the slot 112 of the next downstream link. Thus, the outer end section 60 of each rod 52 is received in two partially-overlapping links 64, passing through the generally circular aperture 114 of one and the axially elongated slot 112 of the other which permits relative sliding movement therewithin. The enlarged head 56 prevents the withdrawal of the rod through those links despite forces experienced by the conveyor belt as the belt traverses its path through the freezer. As the conveyor belt enters a helical path section 22 and the rods 52 become horizontally angularly displaced from one another, the outer ends 60 of the rods 52 spread apart from one another as permitted by the elongation of the slots 112 of the outer bar links 64, which may have a length several times the diameter of the rods 52. The dimensions of the slots 112 are preferably such that the rod does not quite reach the far end of the slot in the final helical configuration so that there is negligible tension in these links; as a result, hoop stress is not created along the outboard edge of the belt which, if upward deflection of the belt were to occur, could give rise to belt upset, e.g. Christmas-tree effect.

As conveyor belt 20 leaves the straight-path section and enters the helical path section 22 at the point of transition, the precise spacing or pitch between rods 52 remains substantially constant at the inboard ends while the belt proportionately expands longitudinally across its width; this allows the heads to smoothly interengage with the vertical drive elements 32 which are arranged along the circumference of the rotating drive drum or cage 28 at equidistant spacings precisely matched to the constant pitch of the rod heads 54. The transition of the rods from the parallel orientation (FIG. 3) to the angular orientation (FIG. 4) pivots the outer end 60 of each rod forward, being displaced slidably forward in the slots 112 of the links 64 which permit such movement relative to the adjacent rod. As the rods pivot from the configuration of FIG. 3 to the configuration of FIG. 4, the bent wire sections 70 or the plastic surface sectors also spread apart, being pulled by the rods 52 during the change in the conveyor belt configuration.

As well known in the conveyor belt art, the bent wire sections 70 or the plastic surface-providing sections can be designed to assure that the rods will not collapse (i.e., will not be displaced toward each other further than their parallel spacing) when disposed in the straight line path section. This can provide some further degree of control over the spacing of rods 52 and some control over the contraction of the belt when the endless belt leaves a helical path section 44 and reenters a straight-path section, for example, immediately upstream of the discharge 48. If the belt is not driven by an ancillary drive which makes contact with the rods adjacent a location where the belt reenters a straight-line path section, there is no positive force acting on the rods to return them to the parallel configuration shown in FIG. 3; optionally, some restraint may be provided along the right-hand or outboard edges of the belt to assure this occurs. For example, the edge of the belt could be routed through upper and lower guides or restraints, such as the parallel flanges of a C-shaped channel 42 mounted along the edge of the straight line path, thereby restraining the edge of the belt to a flat plane and assuring that substantially parallel realignment of the rods occurs.

The regions of the conveyor belt approaching a transition into a downstream helical path have a defined orientation in which the transverse rods 52 of the conveyor belt are parallel to one another and are maintained at precise spacing or pitch. The conveyor belt is primarily driven, as stated above, by the vertical driving elements 32 of cylindrical driving drum 28 although the roller 50a adjacent the discharge is preferably also driven by an ancillary drive (not shown). Because it is not necessary to maintain high tension in the belt as a result of the multitude positive drive connections, such an ancillary drive can be used without difficulty for the entire belt is driven at exactly the same linear belt speed. As the conveyor belt enters the helical path section, the inner edge of the conveyor belt comes into contact with the drive drum 28, and the inboard edge of the conveyor belt is forced to conform to the radius of drum surface. The precise, constant spacing or pitch between adjacent heads 54 of the rods 52 allows the heads to be smoothly engaged by leading surfaces of the drive elements 32 which are spaced apart precise distances equal to the pitch between rod heads 54 (or a multiple thereof which, for purposes of this application, is considered to be in accordance with such pitch).

As best seen in FIG. 4A, the drive elements 32 are constructed in the form of square tubes 82 which form the structural vertical members of the rotating drum or cage 28 and which are equidistantly spaced around the circumference of the drum, which spacing is consistent with the pitch between the heads 54 at the inner end of the rods. Disposed in the surrounding relation about the vertical tubes 82 are elongated jackets 84 which, in this embodiment, are formed to incorporate two drive surfaces 86. Each of the surfaces 86 is radially and vertically oriented, and as best seen in FIG. 4A, the jacket 84 contains two such drive surfaces 86 which are spaced apart precisely the same distance as the pitch between the heads 54 at the inner ends of the rods 52. As should be apparent from FIG. 5, in the ascending helical path 22A, an inner head 54 will be engaged by the leading drive surface 86 near the bottom of the drum and will slidably move slowly vertically upward therealong as this portion of the conveyor belt travels around and around the helical path with the rotating drum 28 until it ultimately disengages at the upper end of the path when it enters the straight-line crossover section 44. The jackets 84 are preferably molded from a wear-resistant thermosetting or thermoplastic material that has a low coefficient of friction, such as UHMW polyethylene, which is preferred, or a suitable fluoroplastic of adequate structural rigidity and wear resistance, e.g. ECTFE, ETFE and PVDF.

Preferably at least 1 of every 3, and more preferably 2 of every 3, heads 54 are engaged by a vertically extending, leading surface 86 of a drive element 32 of the drive drum. In the embodiment illustrated in FIGS. 4 and 4A, two adjacent heads 54 of the conveyor belt are engaged by the pair of drive surfaces 86 on each drive element, and the spacing between drive elements 32 is such that there is one head that is unengaged before the next two are engaged by the following drive element 32. Alternatively, the spacing between the equidistantly circumferentially spaced drive elements 32 could be such that two rod heads are engaged and two rod heads are left unengaged and then the next two rod heads are engaged and so on. Adjacent each drive surface 86 is a perpendicular circumferentially oriented surface 87 that serves as a bearing surface.

It is important that the spacing of the drive elements be arranged so that the spacing between drive surfaces 86 on one individual drive element and drive surfaces 86 on adjacent drive elements is substantially the same as the pitch between rod heads 54. By maintaining this arrangement, and by having a constant pitch between rod heads 54 at the inner edge of the conveyor belt, the entire belt can be driven so as to maintain the inner edge of the belt in only very low or minimal tension and with the outer edge of the belt devoid of tension or at negligible tension. Generally, conveyor belts used in freezers having a helical path are designed to withstand a minimum of 300 pounds of force in tension, whereas the present arrangement allows the belt to be driven with a tension force at the inner edge of about 50 pounds or less. It has been found that the foregoing arrangement not only allows for consistent engagement between the rod heads and the drive surfaces of the drive elements at the beginning of a helical path section, but it assures that engagement between the head and the vertical drive surface is maintained throughout the entire helical path as the head slides slowly upward therealong. This latter aspect assures smooth overall operation and minimizes wear, extending the lifetime of the molded jackets 84 that form an important part of the drive elements. Furthermore, the ability to operate with the inner end of the belt at only very low tension and with substantially negligible tension at the outer end assures that minor deflections caused by unexpected obstacles which may be encountered along the belt path are unlikely to result in upsetting of the belt arrangement that could result in shutdown of the freezer.

In the illustrated embodiment, pivoting of the rods 52 about the fixed spacing at the inboard ends thereof forces the conveyor belt to undergo controlled expansion which is greatest along its outer edge where the bar links 64 permit the outer ends of rods 52 to spread apart the desired distance without creating tension in a longitudinal direction. Accordingly, the only change in configuration of the conveyor belt at such a transition point is an expansion of the remainder of the conveyor belt, while no change occurs at the inboard edge of the belt where driving engagement of the belt is confined. This not only facilitates freezing many types of products carried on the conveyor belt, such as those which are soft and easily deformed at or near room temperature, but allows the use of a longer length of conveyor belt because it can be positively driven at precisely the same speed throughout its length in the freezer. Moreover, this greatly facilitates the use of ascending and descending separate helical path sections as part of a single endless belt and driving such rotating drums from a single motor because both can be driven at precisely the same speed. As the conveyor belt travels along a straight-line path, the rods 52 become disposed in desired transverse orientation, perpendicular to the path of travel of the conveyor belt, while the left hand edge of the belt is maintained in low tension.

Figure 8:
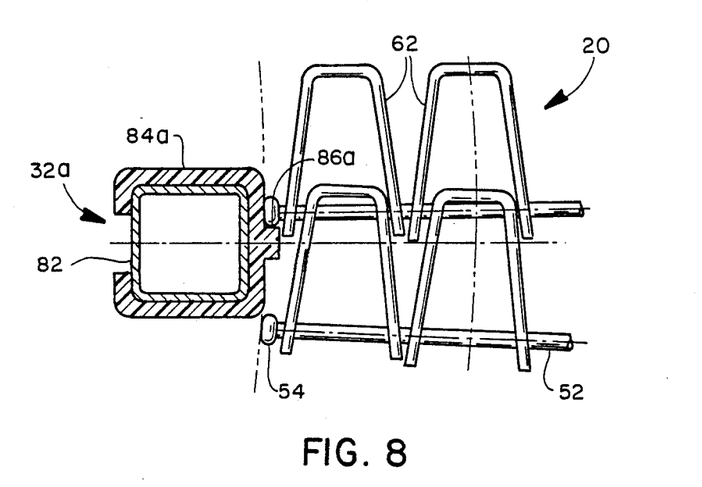
FIGS. 8–11 are cross section views similar to FIG. 4A of alternative drive arrangements for conveyor belts the same or generally similar to that shown in FIG. 4.

Shown in FIGS. 8, 9, 10 and 11 are four alternative embodiments that might be employed. FIG. 8 utilizes a conveyor belt 20, as previously described, wherein the inner ends of rods 52 are interconnected by pairs of links 62 and terminate in heads 54 that are spaced apart at a constant pitch. In this embodiment, the vertical structural tubes 82 of the rotating cage carry surrounding jackets 84a, each having only a single leading drive surface 86a. When this arrangement is employed, the spacing of the tubes 82 circumferentially about the drive cage may be such that the distance between the drive surfaces 86a on adjacent vertical tubes 82 is equal to precisely three times the pitch between the heads 54 at the inner ends of the rods. Thus, one out of every three rod heads of the conveyor belt 20 would be positively driven throughout the helical path.

Figure 9:
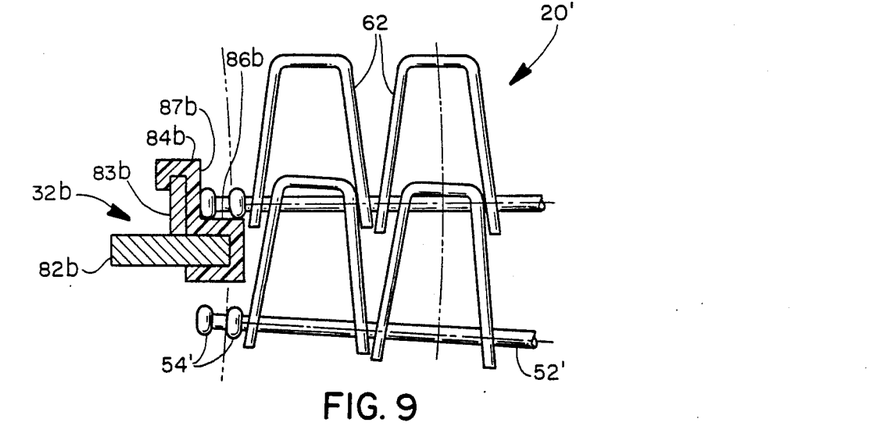

Illustrated in FIG. 9 is a generally similar conveyor belt 20' which includes rods 52' each having a pair of heads 54' at the inner ends thereof. Pairs of interconnecting links 62 of the same construction as described hereinbefore are employed. The dual heads 54' provide a wider region of engagement and also can spread the wear. Drive elements 32b are provided in the form of vertical bars 82b, each aligned radially of the rotating drum and each having affixed thereto a short forwardly extending flange 83b. Elongated molded jackets 84b are carried by each of the vertical bar arrangements and provide leading drive surfaces 86b of a depth sufficient to accommodate the double heads 54', along with an adjacent perpendicular bearing surface 87b which together form a pocket for the head 54'. The spacing may be as described with regard to the FIG. 8 embodiment, so that the drive surfaces 86b are precisely spaced apart a multiple of three times the pitch between the heads 54' of adjacent rods, or the end of every other rod 52' could be engaged.

Figure 10:
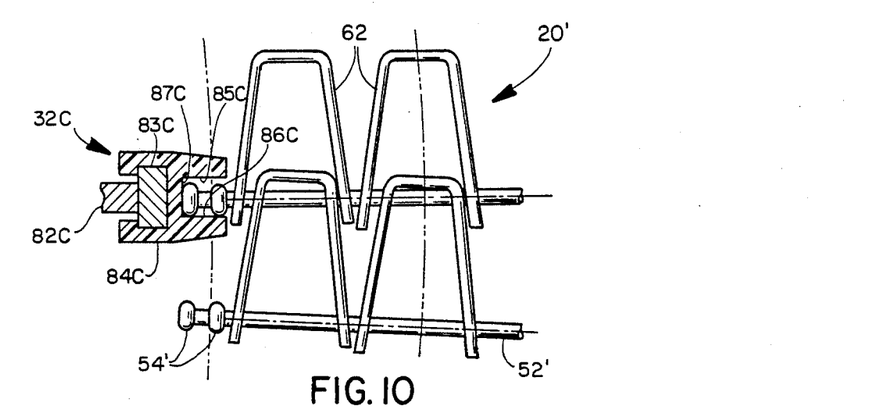

Illustrated in FIG. 10 is another embodiment for driving a conveyor belt 20' in which the rods have double heads 54'. In this arrangement, drive elements 32c include vertical bars 82c arranged radially of the cage, each having a bar 83c affixed to the outer edge thereof in perpendicular orientation thereto. Each bar 83c is partially surrounded by and carries an elongated jacket of similar wear-resistant material that includes an outwardly open vertical groove 85c that has a pair of parallel walls with a perpendicular wall 87c therebetween. One of the walls serves as the drive surface 86c and is of sufficient depth to accommodate the dual heads 54' at the inner ends of each rod, with the wall 87c serving as a bearing surface. The circumferential spacing between adjacent vertical bars 82c of the drive elements, and accordingly between the drive surfaces 86c, is preferably equal to two or three times the pitch between the heads 54' of the rods 52' so that either every other rod or every third rod would be positively driven throughout the helical path section.

Figure 11:
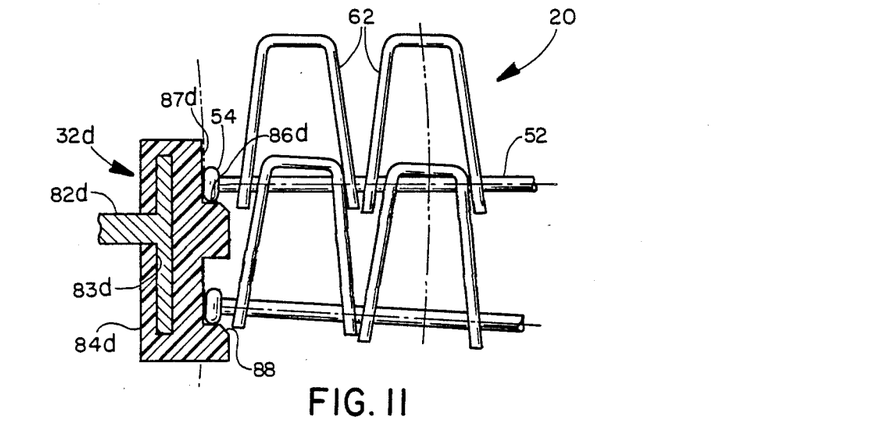

Shown in FIG. 11 is still another alternative embodiment for driving a conveyor belt 20, as previously described, wherein the inner ends of the rods 52 are interconnected by pairs of links 62 and terminate in heads 54 that are spaced apart at a constant pitch. The drive elements 32d utilize vertically extending T-shaped members 82d in the form of a radially oriented stem and a perpendicular cross bar 83d. Each of these structural T-members carries a surrounding jacket 84d formed of suitable molded material, such as ultra high molecular weight polyethylene, which has good structural strength and requires no lubrication to allow the sliding travel of the heads 54 of the rods therealong. These jackets 84d can be installed from one end of the structural member by sliding along the length thereof and thus can be replaced if necessary after operation for a lengthy period. Each of the jackets 84d has two leading, radially oriented drive surfaces 86d, which surfaces are spaced apart precisely the same distance as the pitch between the heads 54 at the inner ends of the rods. In addition, the jackets provide bearing surfaces 87d perpendicular to and adjacent the drive surfaces against which the ends of the heads 54 will seat when there is engagement in the helical path section. In addition, the jackets 84d incorporate champered or canted surfaces 88 which lead into the pockets created by the surfaces 86d and 87d which are believed to be advantageous once some substantial duration of operation has taken place. Wear between moving parts in the conveyor belt can begin to cause minute variations in the distances between adjacent heads; however, the canted lead-in surfaces 88 will make initial contact with the curved surface of the heads 54 and assure that each head is firmly seated against one of the drive surfaces at the point of transition between a straight line path and the helical path. Accordingly, the design shown in FIG. 11 or a similar design incorporating such canted lead-in surfaces may be the most preferred.

As described above, refrigerated vapor or air is circulated throughout the freezer interior and specifically throughout the various ascending and descending windings of the conveyor belt helical sections and thus across the food products carried thereon. Freezers of this design which maintain a temperature substantially below 0° C. have particular advantages, and liquid carbon dioxide or liquid nitrogen can be injected as a refrigeration medium for achieving cryogenic temperatures. A particular advantage of a conveyor belt 20 which is constructed so as to permit it to be positively driven by vertical sliding engagement with precisely spaced drive elements 32 as it travels through a helical path is its ability to maintain smooth, trouble-free operation even if exposed to refrigerated, moisture-laden air having a propensity to deposit frost on its moving parts, or even if subjected to a heavy spray of a liquid cryogen, such as liquid nitrogen. For example, the conveyor belt in the straight-line entrance path section 40 or in a helical path section can be exposed without difficulty to nozzles for expanding liquid carbon dioxide or liquid nitrogen which direct such cryogen against the surfaces of the conveyor belt. In addition to providing an efficient, initial quick-freezing of food products which can substantially completely cover the surface of the conveyor belt, the use of such nozzles can reduce the loss of moisture from food products by quickly crusting the food products.

Although the objects hereinbefore set forth may readily and efficiently be attained by the illustrated apparatus, changes as would be obvious to one having the ordinary skill of the art may be made in the illustrated constructions without departing from the scope of the invention. It is intended that all matter contained in the above description or shown in the accompanying drawings shall be interpreted as illustrative and not in a limiting sense. Particular features of the invention are emphasized in the claims appended hereto.

What is claimed is:

1. A food freezer comprising an insulated enclosure for maintaining temperatures below ambient temperatures therewithin, means forming an entrance and an exit in said enclosure, an endless conveyor belt for carrying products throughout said enclosure from said entrance to said exit, means for driving said conveyor belt so that said endless conveyor belt follows along an initial straight-line path section and then along at least one helical path section, with such helical path portion constituting a significant portion of said belt's total pathway, cooling means for establishing a temperature within said enclosure sufficiently low to satisfactorily remove heat from products carried along said conveyor, said belt having a plurality of horizontal rods extending laterally across said belt which rods are interconnected by means including a plurality of support surface-providing units, said interconnecting means being constructed so that, during change of belt orientation at the transition from said straight-line path section to said helical path section, the pitch between the inner ends of said rods remains constant whereas the pitch between the outer ends of said rods expands, said conveyor belt driving means including at least one cylindrical cage supported for rotation about a vertical axis, said cage having a plurality of equidistantly spaced apart vertical drive elements located circumferentially around said cage, each of said drive elements having at least one radially and vertically extending drive surface, said drive surfaces being spaced apart on a pitch which is the same as said constant pitch at said inner ends of said rods, and said rods having protruding heads at the laterally inner ends thereof, which heads are engaged by said drive surfaces to positively drive said belt throughout its helical path.

2. A freezer in accordance with claim 1 wherein said drive element drive surfaces extend radially outward from a circumferentially oriented surface of said drive element.

3. A freezer in accordance with claim 2 wherein said drive elements extend from a location at the level of the lowest tier of said helical path section to a level at the highest tier thereof and each presents a smooth rectilinear vertical drive surface against which said rod protruding heads slide while remaining positively drivingly engaged.

4. A freezer in accordance with claim 3 wherein said drive surface is formed of a polymeric material having good wear characteristics and a relatively low coefficient of friction.

5. A freezer in accordance with claim 1 wherein said conveyor driving means includes a pair of said cylindrical cages with one of said cages driving said belt along an ascending helical path and the other of said cages driving said belt along a descending helical path.

6. A freezer in accordance with claim 5 wherein both said entrance means and said exit means are located at lower locations in said enclosure.

7. A freezer in accordance with claim 6 wherein both said cylindrical cages are driven from the same motor.

8. A freezer in accordance with claim 6 wherein said cooling means includes a pair of blowers, each mounted axially above one of said cylindrical cages which is open at its top to the intake of said blower and closed at its bottom, so that blowers take suction from the interior of said cages.

9. A freezer in accordance with claim 1 wherein each of said drive elements includes two of said drive surfaces which are spaced apart a distance equal to said pitch between said rod heads.

10. A food freezer comprising an insulated enclosure for maintaining temperatures below ambient temperatures therewithin, means forming an entrance and an exit in said enclosure, an endless conveyor belt for carrying products from said entrance to said exit throughout said enclosure, means for driving said conveyor belt so that said endless conveyor belt follows along an initial straight-line path section and then along an ascending helical path section, a second straight-line section, a descending helical path section and a third straight-line path section leading to said exit from said enclosure, cooling means for establishing a temperature within said enclosure sufficiently low to satisfactorily remove heat from products carried along said conveyor, said belt having a plurality of horizontal rods extending laterally across said belt which rods support a plurality of support surface-providing units, means interconnecting said rods so that the pitch between adjacent rods in said belt at the inner lateral edge of said belt remains constant during the transition from said straight-line path section to said helical path section whereas longitudinal expansion of the pitch between said rods occurs at the outer lateral edge of said belt, said conveyor belt driving means including two cylindrical cages supported for rotation about vertical axes, each said cage having a plurality of equidistantly spaced apart vertical drive elements located circumferentially around said cage, said drive elements having a radially and vertically extending drive surfaces, which are spaced apart on the same pitch as said pitch at the inner ends of the rods, and said rods having protruding heads at the laterally inner ends thereof, which heads are engaged by said drive surfaces to positively drive said belt throughout both its helical paths.

11. A freezer in accordance with claim 10 wherein both said cylindrical cages are driven from the same motor.

12. A freezer in accordance with claim 10 wherein said cooling means includes a pair of blowers each respectively mounted axially above one of said cylindrical cages, which cage is open at its top to the intake of said blower and closed at its bottom, said blowers taking suction from the interior of said cages.

13. A food freezer comprising an insulated enclosure for maintaining temperatures below ambient temperatures therewithin, means forming an entrance and an exit in said enclosure, an endless conveyor belt for carrying products from said entrance to said exit throughout said enclosure, means for driving said conveyor belt so that said endless conveyor belt follows along an initial straight-line path section and then along at least one helical path section, with such helical path portion constituting a significant portion of said belt's total pathway, cooling means for establishing a temperature within said enclosure sufficiently low to satisfactorily remove heat from products carried along said conveyor, said belt having a plurality of horizontal rods extending laterally across said belt which rods are interconnected by means including a plurality of support surface-providing units, said interconnecting means being constructed so that, during change of belt orientation from said straight-line path section to said helical path section, the pitch between the inner ends of said rods remains constant whereas the pitch between the outer ends of said rods expands and being further constructed so that there is negligible longitudinal tension along the outer edge of said belt in said helical path configuration, said conveyor belt driving means including at least one cylindrical cage supported for rotation about a vertical axis, said cage having a plurality of equidistantly spaced apart vertical drive elements located circumferentially around said cage, each of said drive elements having at least one radially and vertically extending drive surface, and said rods having protruding heads at the laterally inner ends thereof, which heads are engaged by said drive surfaces to positively drive said belt throughout its helical path, whereby the inner edge of said conveyor belt is maintained in low tension throughout said helical path and generally along its entire length and said outer edge is subjected to negligible longitudinal tension.

* * * * *